(12) United States Patent
Masuda

(10) Patent No.: US 9,818,180 B2
(45) Date of Patent: Nov. 14, 2017

(54) IMAGE PROCESSING DEVICE, METHOD, AND PROGRAM

(71) Applicant: FUJIFILM CORPORATION, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/185,610

(22) Filed: Jun. 17, 2016

(65) Prior Publication Data

US 2016/0292841 A1 Oct. 6, 2016

Related U.S. Application Data

(63) Continuation of application No. PCT/JP2015/053453, filed on Feb. 9, 2015.

(30) Foreign Application Priority Data

Mar. 20, 2014 (JP) ................................ 2014-058588

(51) Int. Cl.
*G06K 9/46* (2006.01)
*G06T 7/00* (2017.01)
*H04N 5/247* (2006.01)
*G06T 7/73* (2017.01)

(52) U.S. Cl.
CPC ............... *G06T 7/001* (2013.01); *G06T 7/75* (2017.01); *H04N 5/247* (2013.01)

(58) Field of Classification Search
CPC ............ G06T 7/001; G06T 7/75; H04N 5/247
See application file for complete search history.

(56) References Cited

U.S. PATENT DOCUMENTS

| 6,914,599 B1 | 7/2005 | Rowe et al. | |
| 2013/0258100 A1* | 10/2013 | Asatani | G01C 3/08 |
| | | | 348/140 |
| 2014/0192159 A1* | 7/2014 | Chen | G06T 15/20 |
| | | | 348/46 |

FOREIGN PATENT DOCUMENTS

| JP | 7-318331 A | 12/1995 |
| JP | 2000-20728 A | 1/2000 |
| JP | 2010-198554 A | 9/2010 |

OTHER PUBLICATIONS

International Search Report for PCT/JP2015/053453 (PCT/ISA/210) dated May 19, 2015.
Written Opinion of the International Searching Authority for PCT/JP2015/053453 (PCT/ISA/237) dated May 19, 2015.

* cited by examiner

*Primary Examiner* — Phuoc Tran
(74) *Attorney, Agent, or Firm* — Birch, Stewart, Kolasch & Birch, LLP

(57) ABSTRACT

It is possible to determine whether or not a specific shape candidate obtained from a captured standard image has a corresponding shape in an actual space. A shape surrounded by straight lines is detected from a standard image as a candidate having a rectangular shape. A target object image obtained by imaging a target object representing the candidate having the rectangular shape at a viewing angle different from the viewing angle of the standard image is generated. The generated target object image is detected from a reference image obtained by imaging the target object at a different viewing angle. If the target object image is detected, the target object represented by the candidate having the rectangular shape is determined to be a rectangle.

10 Claims, 11 Drawing Sheets

STANDARD IMAGE

REFERENCE IMAGE

IMAGE PROCESSING DEVICE, METHOD, AND PROGRAM

CROSS REFERENCE TO RELATED APPLICATIONS

This application is a Continuation of PCT International Application No. PCT/JP2015/053453, filed on Feb. 9, 2015, which claims priority under 35 U.S.C. 119(a) to Patent Application No. 2014-058588, filed in Japan on Mar. 20, 2014, all of which are hereby expressly incorporated by reference into the present application.

BACKGROUND OF THE INVENTION

1. Field of the Invention

The present invention relates to an image processing device, a method, and a non-transitory recording medium storing a computer-readable program.

2. Description of the Related Art

Various image processing techniques have been suggested. For example, there are the following techniques: a technique which extracts an object from each of images of a plurality of cameras, defines a size in a three-dimensional space on a ground surface, and compares the heights of the objects to determine that the objects are the same (JP2000-020728A); a technique which recognizes an object by giving at least two kinds of information, such as sectional area and height, sectional area and volume, or volume and height, among size information of an object to an object recognition neural network along with normalized shape information (JP1995-318331A (JP-H07-31833 A)); and a technique which selects four points from among correspondence points of stereo camera images, determines three-dimensional plane information included in these points, determines a tilt angle from the three-dimensional information, and corrects the images so as to be directed toward the front (JP2010-198554A).

SUMMARY OF THE INVENTION

In a case where there is a shape, such as an oblong or a parallelogram, surrounded by straight lines on an image, it is possible to comparatively simply determine the aspect ratio of the shape. However, in a case where a shape, such as an oblong or a parallelogram, surrounded by straight lines is included in an image obtained by imaging, if the size thereof is known, the shape is known; however, it is not possible to determine whether a target object in an actual space represented by the shape is actually an oblong or a parallelogram according to a viewing angle. This is not considered in JP2000-020728A, JP1995-318331A (JP-H07-318331A), and JP2010-198554A.

An object of the invention is to determine whether or not a shape surrounded by straight lines included in an image obtained by imaging has such a shape even if the size thereof is not known in an actual space.

An image processing device according to the invention comprises a standard image input device (standard image input means) for inputting a standard image obtained by imaging, a reference image input device (reference image input means) for inputting a reference image obtained by imaging at a viewing angle different from a viewing angle when capturing the standard image, a specific shape candidate detection device (specific shape candidate detection means) for estimating and detecting a shape (a shape, such as a triangle, a rectangle, a parallelogram, a pentagon, or other polygons, surrounded by straight lines is called a specific shape) surrounded by straight lines from the standard image input from the standard image input device as a specific shape candidate having a specified shape (for example, a rectangle), a virtual target object information generation device (virtual target object information generation means) for generating virtual target object information (including coordinates and a virtual target object image) for specifying a virtual target object image obtained in a case of imaging a target object represented by the specific shape candidate detected by the specific shape candidate detection device at a viewing angle different from the viewing angle when capturing the standard image, a virtual target object image detection device (virtual target object image detection means) for detecting the virtual target object image from the reference image input from the reference image input device using the virtual target object information generated by the virtual target object information generation device, a shape determination device (shape determination means) for determining the specific shape candidate detected by the specific shape candidate detection device as a specific shape having the specified shape when the virtual target object image has been detected by the virtual target object image detection device, a generation control device (generation control means) for controlling the virtual target object information generation device so as to generate the virtual target object information for specifying the virtual target object image obtained by changing at least one of the size and the position of the virtual target object image when the virtual target object image has not been detected by the virtual target object image detection device, and a (repetition control (repetition control means) for repeating detection processing in the virtual target object image detection device, determination processing in the shape determination device, and control processing in the generation control device.

The invention also provides an image processing method. That is, the method comprises a step in which a standard image input device inputs a standard image obtained by imaging, a step in which a reference image input device inputs a reference image obtained by imaging at a viewing angle different from a viewing angle when capturing the standard image, a step in which a specific shape candidate detection device estimates and detects a shape surrounded by straight lines from the standard image input from the standard image input device as a specific shape candidate having a specified shape, a step in which a virtual target object information generation device generates virtual target object information for specifying a virtual target object image obtained in a case of imaging a target object represented by the specific shape candidate detected by the specific shape candidate detection device at a viewing angle different from the viewing angle when capturing the standard image, a step of detecting the virtual target object image from the reference image input from the reference image input device using the virtual target object information generated by the virtual target object information generation device, a step in which a shape determination device determines the specific shape candidate detected by the specific shape candidate detection device as a specific shape having the specified shape when the virtual target object image has been detected by the virtual target object image detection device, a step in which a generation control device performs control such that the virtual target object information generation device generates the virtual target object information for specifying the virtual target object image obtained by changing at least one of the size and the position of the virtual target object image when the virtual target object image has not been detected by the virtual target object image detection device, and a step in which a repetition control device repeats detection processing in the virtual target object image detection device, determination processing in the shape determination device, and control processing in the generation control device.

The invention provides a recording medium storing a program which controls a computer of an image processing device. The program may be provided.

The image processing device may further comprise a correction device (correction means) for correcting a specific shape determined to be a shape having the specified shape determined by the shape determination device to a shape obtained in a case of imaging the target object from the front.

For example, the virtual target object information generation device may generate the virtual target object information based on one or a plurality of sizes determined in advance in a case where the size of the target object is known.

The image processing device may further comprise an angle calculation device (angle calculation means) for calculating an angle represented by the contour of the target object in an actual space, and a specific shape determination device (specific shape determination means) for determining a target specific shape candidate among specific shape candidates detected by the specific shape candidate detection device based on an angle calculated by the angle calculation device. In this case, for example, the virtual target object information generation device may generate virtual target object information for specifying a virtual target object image obtained in a case of imaging a target object represented by a specific shape determined by the specific shape determination device at a viewing angle different from the viewing angle when capturing the standard image.

The image processing device may further comprise a state determination device (state determination means) for determining whether a plurality of specific shapes are on the same plane, parallel planes, or vertical planes in a case where there are a plurality of specific shapes specified in the shape determination device.

The specified shape may be a triangle, a rectangle, a trapezoid, or a parallelogram.

The image processing device may further comprise a first imaging device which captures the standard image, and a second imaging device which captures the reference image. The standard image input device and the reference image input device may be a single imaging device. In this case, the standard image input device and the reference image input device may input the standard image and the reference image obtained by imaging in the imaging device.

According to the invention, a shape (for example, a triangle, a rectangle, a parallelogram, a trapezoid, or the like) surrounded by straight lines is estimated and detected from a standard image obtained by imaging as a specific shape candidate (for example, a rectangle) having a specified shape. Virtual target object information (may include coordinates and a virtual target object image) for specifying a virtual target object image obtained by imaging a target object in an actual space represented by the detected specific shape candidate at a viewing angle different from a viewing angle when capturing the standard image is generated. If the virtual target object image is detected from a reference image obtained by imaging at a different viewing angle using the generated virtual target object information, the detected specific shape candidate is determined to be a specific shape having the specified shape. If the specific shape candidate has the specified shape, the virtual target object image is detected from the reference image; thus, in a case where the virtual target object image is detected from the reference image, it is possible to determine the specific shape candidate to be a specific shape having the specified shape, and can be determined to have such a specific shape even in the actual space. If the virtual target object image is not detected, the virtual target object information for specifying the virtual target object image is generated such that at least one of the size and the position of the virtual target object image is changed. The detection of the virtual target object image from the reference image and the shape determination are repeated using the generated virtual target object information. Even if the size in the actual space is not known, it can be determined as a specific shape having the specified shape in the actual space.

DESCRIPTION OF THE PREFERRED EMBODIMENTS

Figure 1:
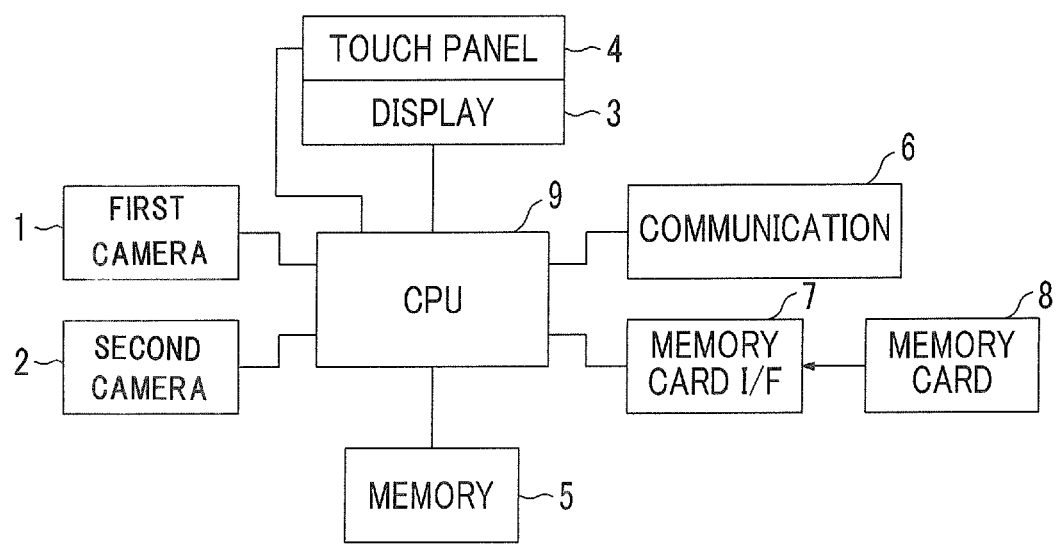
FIG. 1 shows an example of the electric configuration of an image processing device.

FIG. 1 shows an example of the invention and is a block diagram showing an electric configuration of an image processing device.

The image processing device may be portable, like a smartphone, and may be installed outdoors.

The overall operation of the image processing device is controlled by a CPU 9.

The image processing device includes a first camera (a standard image input device) 1 and a second camera (a reference image input device) 2. The first camera 1 inputs a standard image obtained by imaging to the image processing device, and the second camera 2 inputs a reference image obtained by imaging at a viewing angle different from that of the standard image to the image processing device. At least one of the first camera 1 and the second camera 2 may not be provided in the image processing device as long as a standard image and a reference image are input to the image processing device. For example, a standard image and a reference image may be obtained by imaging twice using one camera at different angles of views. The cameras may not be provided in the image processing device.

The image processing device is provided with a display device 3. A touch panel 4 is formed on a display screen of the display device 3. An instruction from the touch panel 4 is input to the CPU 9. Furthermore, the image processing device is provided with a memory 5 which stores data, a communication device 6 which is used for connection through a network, such as the Internet, and a memory card interface 7. A memory card 8 which stores a program for controlling processing described below is read through the memory card interface 7. Then, the read program is installed on the image processing device. The program may not be stored in a potable recording medium, such as the memory card 8, and a program which is transmitted through a network may be received in the communication device 6, and the received program may be installed on the image processing device.

Figure 2:
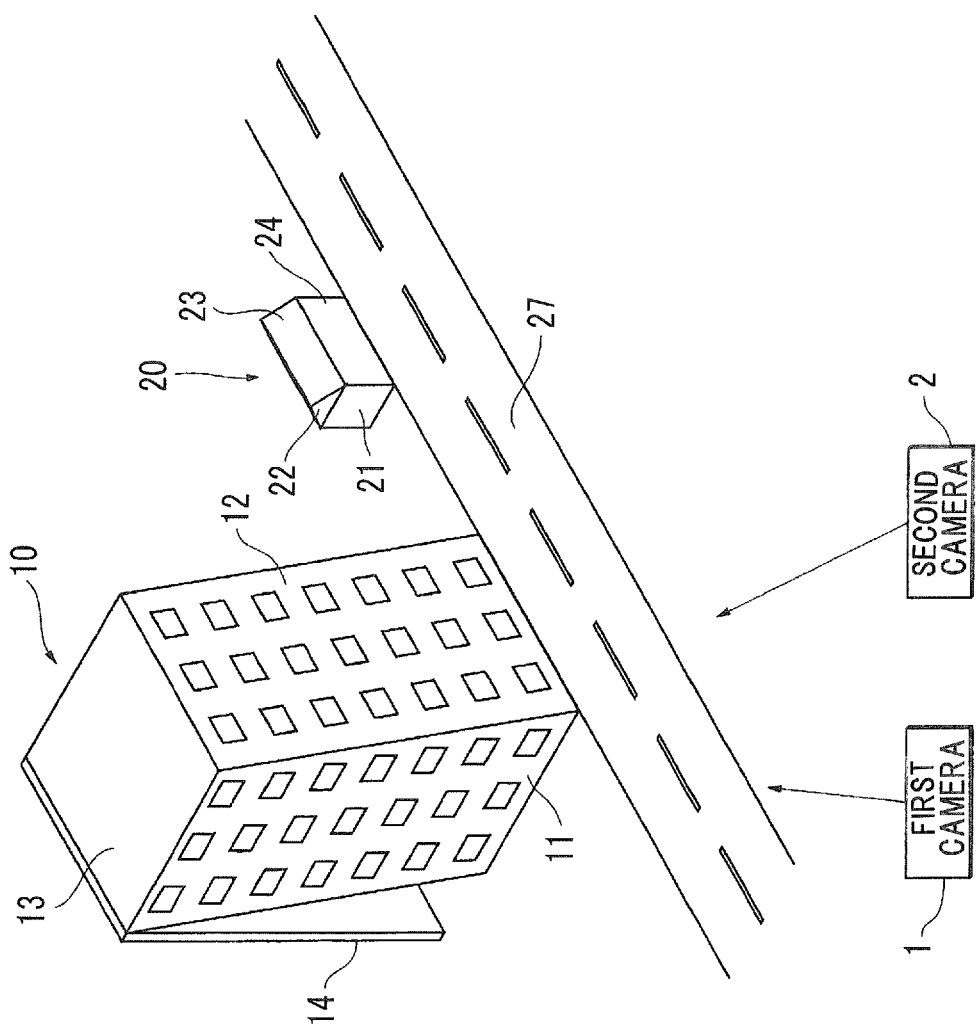
FIG. 2 shows an example of an actual space.

FIG. 2 shows an example of outdoor scenery.

A first building 10 and a second building 20 stand along a road 27. A side wall 11 of the first building 10 in an actual space has a parallelogram shape, a front wall 12 and a rooftop 13 of the first building 10 have a rectangular shape, and a rear wall 14 of the first building 10 has a rectangular shape when viewed from the rear. While walls 21 and 24 of the second building 20 in an actual space have a rectangular shape, a roof side 22 of the second building 20 has a regular triangular shape and a roof front 23 has a rectangular shape. It is assumed that such scenery is imaged using the first camera 1 and the second camera 2 with different angles of view.

Figure 3:
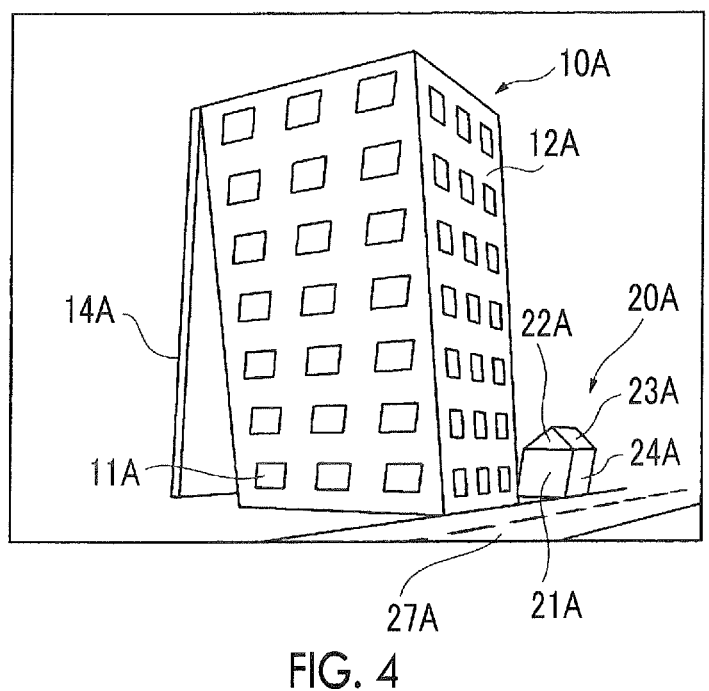
FIG. 3 shows an example of a standard image.

FIG. 3 shows an example of an image (also referred to as a standard image) obtained by imaging using the first camera 1.

The standard image includes a first building image 10A, a second building image 20A, and a road image 27A. The first building image 10A, the second building image 20A, and the road image 27A correspond to the first building 10, the second building 20, and the road 27 shown in FIG. 2. A side wall image HA, a front wall image 12A, and a rear wall image 14A of the first building image 10A correspond to the side wall 11, the front wall 12, and the rear wall 14 of the first building 10 shown in FIG. 2, and a side wall image 21A, a front wall image 24A, and a roof front image 23A, and a roof side image 22A of the second building image 20A correspond to the side wall 21, the front wall 24, the roof front 23, and the roof side 22 of the second building 20 shown in FIG. 2.

Figure 4:
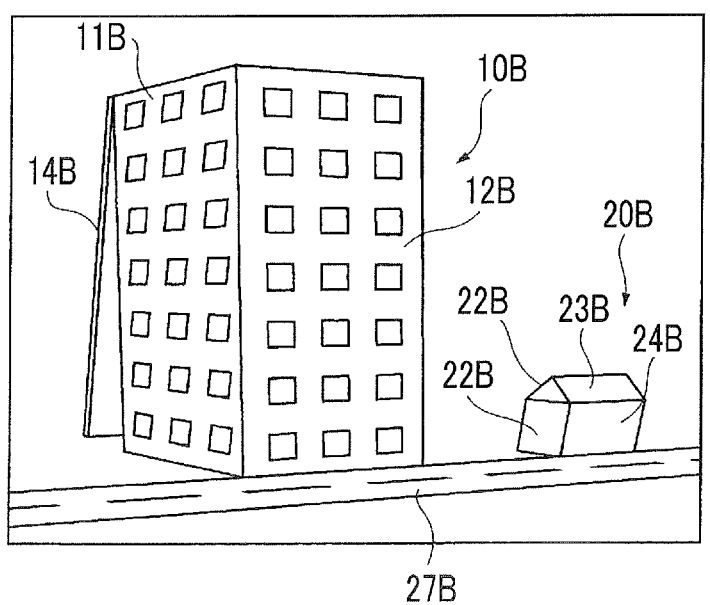
FIG. 4 shows an example of a reference image.

FIG. 4 shows an example of an image (also referred to as a reference image) obtained by imaging using the second camera 2.

Similarly to the standard image, the reference image includes a first building image 10B, a second building image 20B, and a road image 27B. The first building image 10B, the second building image 20B, and the road image 27B correspond to the first building 10, the second building 20, and the road 27 shown in FIG. 2. A side wall image 11B, a front wall image 12B, and a rear wall image 14B of the first building image 10B correspond to the side wall 11, the front wall 12, and the rear wall 14 of the first building 10 shown in FIG. 2, and a side wall image 21B, a front wall image 24B, a roof front image 23B, and a roof side image 22B of the second building image 20B correspond to the side wall 21, the front wall 24, the roof front 23, and the roof side 22 of the second building 20 shown in FIG. 2.

The first camera 1 and the second camera 2 are disposed in the image processing device so as to have different angles of view; thus, a standard image (see FIG. 3) obtained by imaging with the first camera 1 and a reference image (see FIG. 4) obtained by imaging with the second camera 2 have different angles of view.

Figure 5:
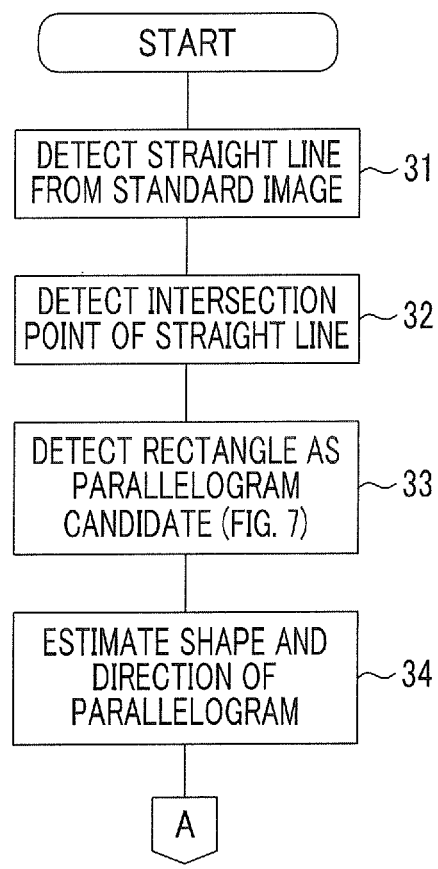
FIG. 5 is a flowchart showing a processing procedure of the image processing device.
Figure 6:
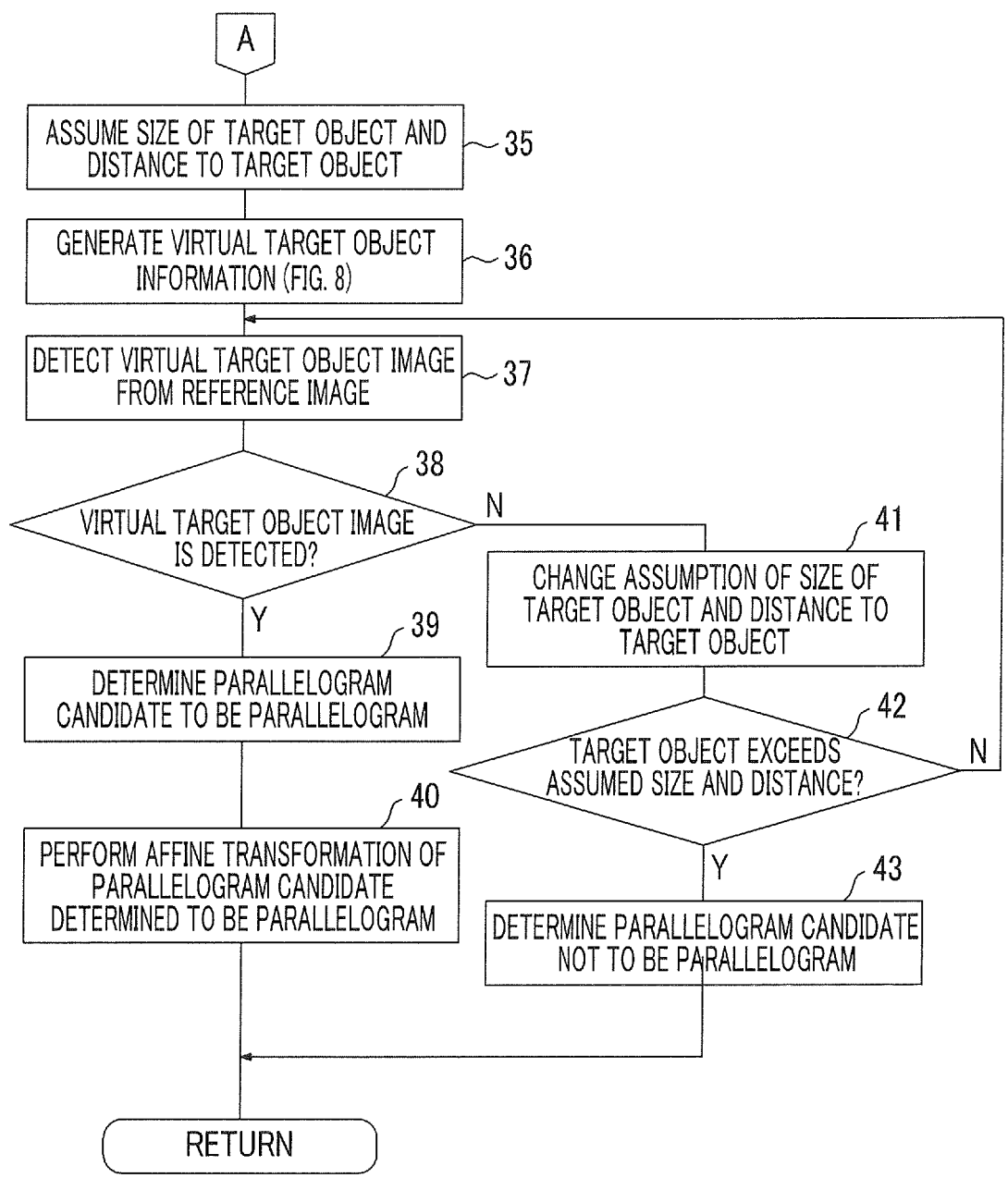
FIG. 6 is a flowchart showing a processing procedure of the image processing device.

FIGS. 5 and 6 are flowcharts showing a processing procedure of the image processing device.

This processing procedure determines whether or not a target object image representing a target object of a specific shape (a shape, such as a triangle, a rectangle, a parallelogram, a trapezoid, a square, or a polygon equal to or more than a pentagon, surrounded by straight lines is called a specific shape) having a rectangular shape (specified shape) in the actual space is included in the standard image; thus, specifically, it is determined whether or not a target object image representing a target object having a parallelogram shape is included in the standard image.

First, the CPU detects straight lines from a standard image obtained by imaging (Step 31). Subsequently, the CPU detects intersection points of the detected straight lines (Step 32). A rectangle (specific shape) surrounded by the straight lines is detected as a parallelogram candidate (a specific shape candidate having a specified shape) (Step 33).

Figure 7:
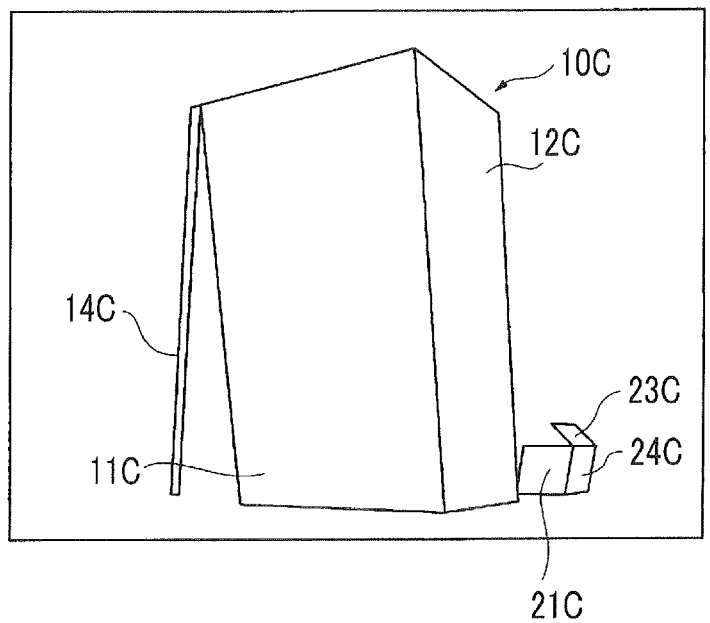
FIG. 7 shows a manner in which a shape surrounded by straight lines is detected from a standard image.

FIG. 7 shows an example of a detected parallelogram candidate (specific shape candidate).

Parallelogram candidate images 11C, 12C, and 14C are estimated and detected from the side wall image 11A, the front wall image 12A, and the rear wall image 14A of the first building image 10A included in the standard image of FIG. 3 as a parallelogram candidate. The CPU 9 estimates and detects parallelogram candidate images 24C, 21C, and 23C from the side wall image 21A, the front wall image 24A, and the roof front image 23A of the second building image 20A included in the standard image of FIG. 3 as a parallelogram candidate (a shape surrounded by straight lines is estimated and detected as a specific shape candidate having a specified shape: a specific shape candidate detection device).

If the parallelogram candidate image 11C, 12C, 14C, 21C, 23C, and 24C are detected, the shape and the direction of a parallelogram represented by the parallelogram candidate images 11C, 12C, 14C, 21C, 23C, and 24C in the actual space are estimated (Step 34). The estimation will be described below in detail.

Subsequently, the size of a target object represented by the parallelogram candidate images 11C, 12C, 14C, 21C, 23C, and 24C in the actual space and the distance to the target object are assumed (Step 35). The size of the target object is assumed from a general size of an object considered to be a target object, for example, a building, a vehicle, a sign, a number plate, or a book. The same applies to the distance to the target object. Like the number plate or the book, an object whose size is standardized in advance is preferably set from information relating to the size standards stored in the device.

The CPU 9 generates virtual target object information (Step 36) (a virtual target object information generation device). The virtual target object information specifies a virtual target object image obtained by imaging a target object represented by the detected parallelogram candidate image (specific shape candidate image) with the second camera 2. The virtual target object information may be the virtual target object image or may be the coordinates for specifying the position and size of the virtual target object image. In this example, it is assumed that the virtual target object image is used as the virtual target object information.

Figure 8:
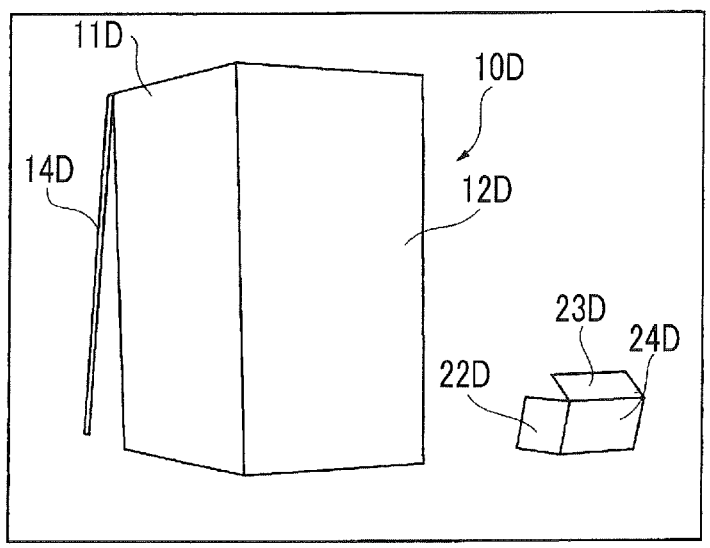
FIG. 8 shows an example of a virtual target object image.

FIG. 8 shows an example of the virtual target object image.

Virtual target object images 11D, 12D, 14D, 21D, 23D, and 24D are obtained in a case of imaging parallelogram target objects from the imaging angle of the second camera 2 on an assumption that the parallelogram candidate images 11C, 12C, 14C, 21C, 23C, and 24C are obtained by imaging the parallelogram target objects.

The CPU 9 performs detection processing for determining whether or not the thus-generated virtual target object images 11D, 12D, 14D, 21D, 23D, and 24D are included in the reference image shown in FIG. 4 (Step 37) (a virtual target object image detection device). If one of the virtual target object images 11D, 12D, 14D, 21D, 23D, and 24D is detected from the reference image (in Step 38, YES), the CPU 9 determines a target object represented by the parallelogram candidate image corresponding to the detected virtual target object image to be a parallelogram (specific shape) (Step 39) (a shape determination device). For example, if the virtual target object image 11D is detected from the reference image of FIG. 2 (since the side wall 11 of the first building 10 has a parallelogram shape, the side wall image 11B of the first building image 10B is detected), it is determined that a target object (the side wall 11 of the first building 10) in the actual space corresponding to the virtual target object image 11D is a parallelogram. The parallelogram candidate image 11C determined to be a parallelogram is subjected to affine transformation, and an image having a corrected shape obtained by imaging a target object corresponding to the parallelogram candidate image from the front is obtained (Step 40) (a correction device). For example, an image obtained in a case of imaging the side wall 11 of the first building 10 shown in FIG. 2 from the front is obtained through affine transformation. The side wall image 11A (see FIG. 3) corresponding to the side wall 11 determined to be a parallelogram may be displayed so as to be known to be a parallelogram (for example, surrounded with a determined color), or the coordinates, the area, the length of a side, or the like may be recorded.

In a case where a virtual target object image is not detected from the reference image shown in FIG. 4 (in Step 38, NO), the CPU 9 changes the assumption of the size of the target object and the distance to the target object (Step 41). With this, the sizes and positions of the virtual target object images 12D, 14D, 21D, 23D, and 24D shown in FIG. 8 are changed (a generation control device). In a case where there are a plurality of target objects and the sizes thereof are known in advance, a virtual target object image (information) according to the size of each target object is generated. Until a target object exceeds the assumed size and distance (in Step 42, NO), the processing (the detection processing in the virtual target object image detection device, the determination processing in the shape determination device, and the control processing in the generation control device) after Step 37 are repeated (a repetition control device). In a process of repeating these kinds of processing, image portions corresponding to the virtual target object images 12D, 14D, 21D, 23D, and 24D are detected from the reference image shown in FIG. 4, and target objects 12, 14, 21, 23, and 24 in the actual space corresponding to the virtual target object images 12D, 14D, 21D, 23D, and 24D are determined to be a parallelogram.

It is determined that a parallelogram candidate corresponding to a target object exceeding the assumed size and distance is not a parallelogram (specific shape candidate) (in Step 42, YES, and Step 43).

Figure 9:
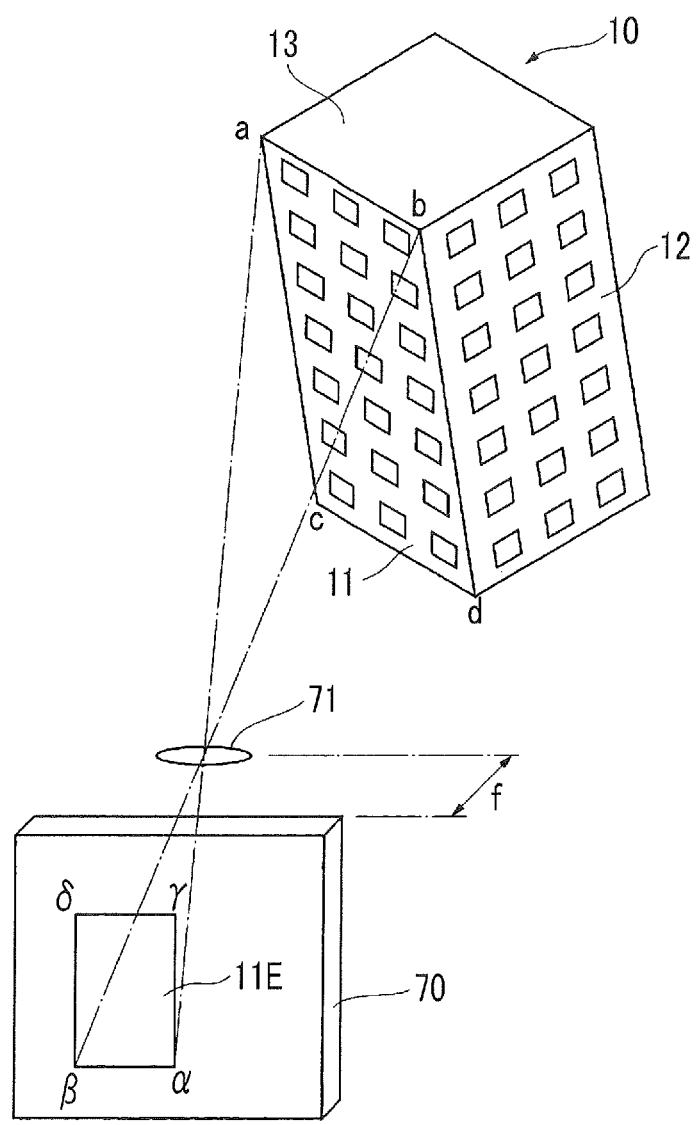
FIG. 9 shows a manner in which a target object is imaged.

FIG. 9 illustrates processing for estimating a parallelogram (specific shape) in the actual space.

For example, if it is assumed that the side wall 11 of the first building 10 is imaged by an image sensor 70 embedded in the first camera 1, an optical image representing the side all 11 is formed on the light receiving surface of the image sensor 70 by an imaging lens 71 (focal distance t) of the first camera 1. An image 11E of the side wall 11 is formed on the light receiving surface of the image sensor 70.

The coordinates of four corners of the image 11E of the side wall 11 formed on the image sensor 70 are represented as $\alpha=(u1,v1)$, $\beta=(u2,v2)$, $\gamma=(u3,v3)$, and $\delta=(u4,v4)$. The coordinates $\alpha$, $\beta$, $\gamma$, and $\delta$ of the four corners correspond to the four corners a, b, c, and d of the side wall 11 in the actual space. If the coordinates of the center of the image 11E of the side wall 11 are (u0,v0), the coordinates $a=(x1,y1,z1)$, $b=(x2,y2,z2)$, $c=(x3,y3,z3)$, and $d=(x4,y4,z4)$ of the four corners a, b, c, and d in the actual space are as follows. However, A, B, C, and D are coefficients (magnification).

$$x1=A(u1-u0), y1=A(v1-v0), z1=Af$$

$$x2=B(u2-u0), y2=B(v2-v0), z2=Bf$$

$$x3=C(u3-u0), y3=C(v3-v0), z3=Cf$$

$$x4=D(u4-u0), y4=D(v4-v0), z4=Df$$

Since the four corners a, b, c, and d in the actual space are present where the coefficients A, B, C, and D become constants, in a case where the four corners a, b, c, and d in the actual space form a parallelogram, Expression 1 is established.

$$\vec{ab}=\vec{cd} \qquad \text{Expression 1}$$

The coefficient relationships B/A, C/A, and D/A are determined from Expression 1 and the relationship of the coordinates of the four corners a, b, c, and d in the actual space described above. Since the coefficient A is not uniquely determined, the size of the side wall 11 defined by the four corners a, b, c, and d and the distance to the side wall 11 cannot be determined; however, the direction of the side wall 11 is determined.

Figure 10:
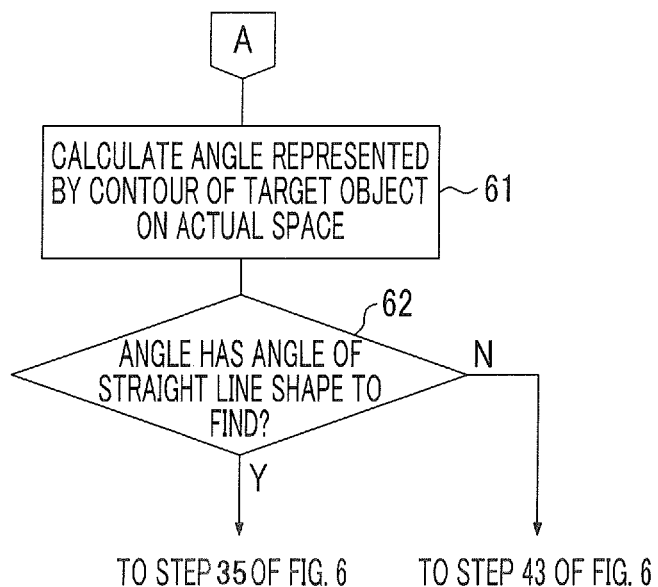
FIG. 10 is a flowchart showing a part of a processing procedure of the image processing device.

FIG. 10 shows a modification example and shows a part of a processing procedure of the image processing device.

If the shape and the direction of a parallelogram (specific shape) in the actual space are estimated (FIG. 5, Step 34), an angle represented by the contour of a target object in the actual space is calculated (FIG. 10, Step 61) (an angle calculation device). For example, an angle represented by the contour of the side wall 11 of the first building 10 is calculated. It is determined whether or not the calculated angle has an angle of a found specific shape (Step 62). For example, in a case where only a specific shape having a rectangular shape is found, it is determined whether or not there is a right angle. If there is no such angle (in Step 62, NO), it is determined that the parallelogram candidate is not a rectangle (FIG. 6, Step 43). If there is such an angle (in Step 62, YES), the processing after Step 35 of FIG. 6 is performed, and a rectangle is detected (a specific shape determination device).

In a case where the specific shape is a regular triangle, the direction of the regular triangle can be determined as follows.

Figure 11:
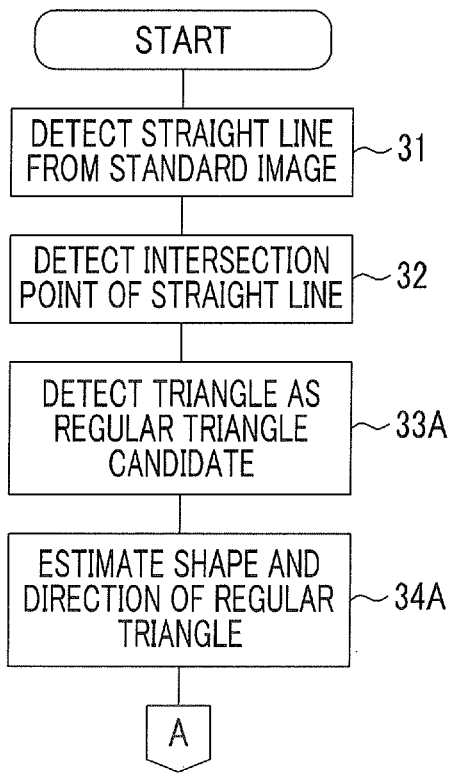
FIG. 11 is a flowchart showing a processing procedure of the image processing device.
Figure 12:
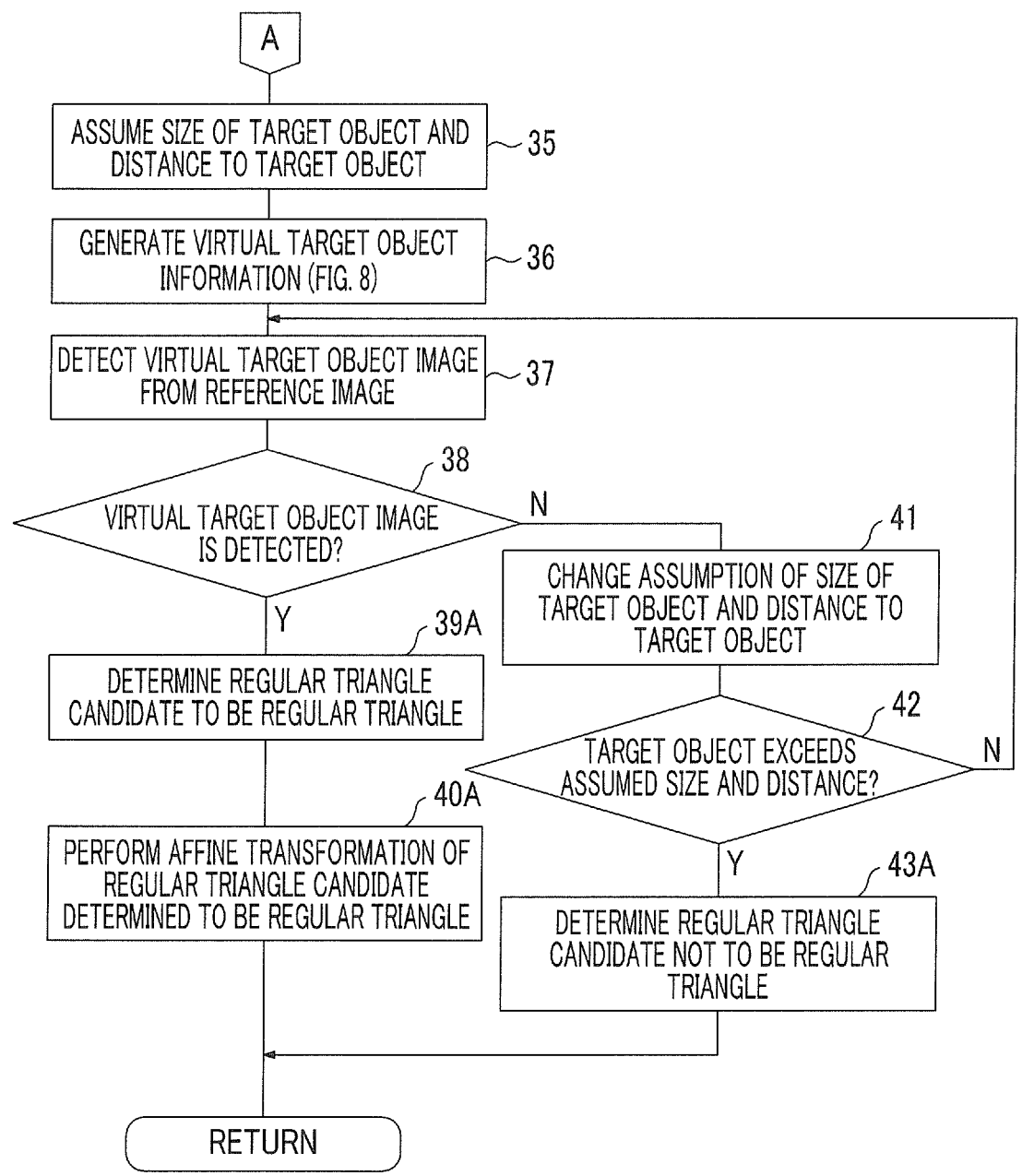
FIG. 12 is a flowchart showing a processing procedure of the image processing device.

FIGS. 11 and 12 are flowcharts showing another processing procedure of the image processing device, and correspond to the processing procedure shown in FIGS. 5 and 6. In FIG. 11 or 12, the same processing as the processing shown in FIG. 5 or 6 is represented by the same reference numeral, and description thereof will not be repeated.

Although the processing shown in FIGS. 5 and 6 is the processing for detecting a parallelogram, FIGS. 11 and 12 show processing for detecting a regular triangle.

As described above, straight lines and intersection points are detected from the standard image (see FIG. 3) (Steps 31 and 32), and an obtained triangle is estimated and detected as a regular triangle candidate (Step 33A). As described below, the shape and the direction of the regular triangle are estimated (Step 34A).

The same processing as the processing described above is performed, and a regular triangle candidate determined to be a regular triangle is subjected to affine transformation as if a target object image specified by the detected regular triangle candidate is imaged from the front (Steps 39A and 40A). It is determined that other regular triangle candidates are not a regular triangle (Step 43A).

Figure 13:
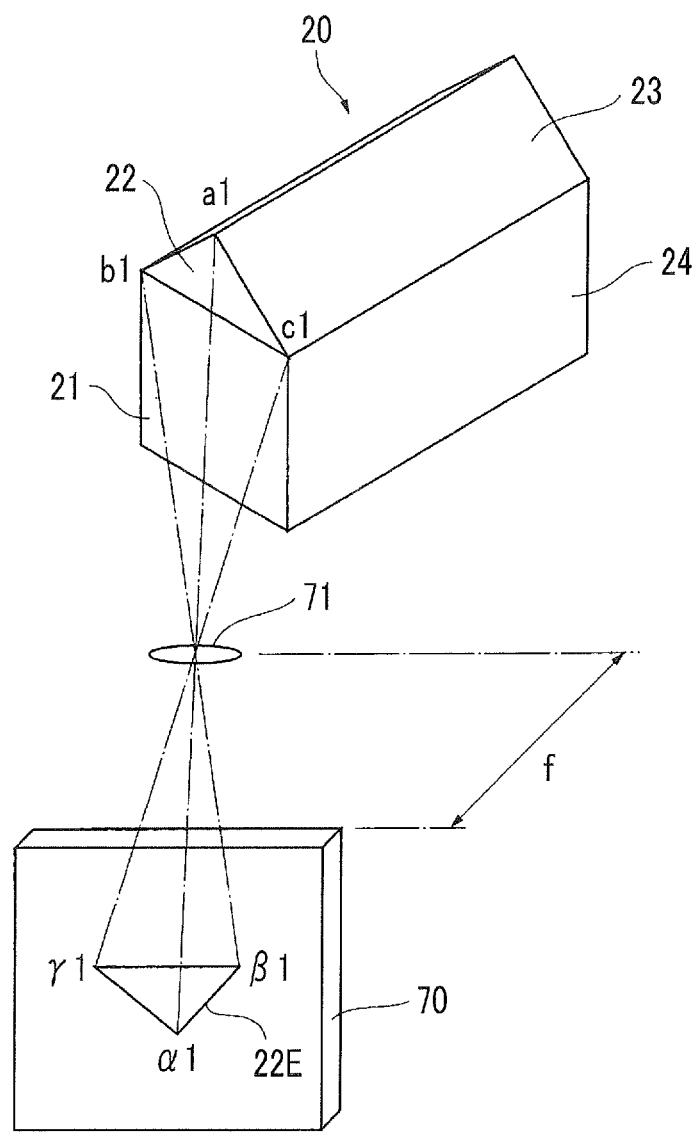
FIG. 13 shows a manner in which a target object is imaged.

FIG. 13 shows a manner in which a roof side 22 of a regular triangle is imaged.

Similarly to the above, if it is assumed that imaging is performed with the image sensor 70 embedded in the first camera 1, an optical image representing the roof side 22 is formed on the light receiving surface of the image sensor 70 by the imaging lens 71 of the first camera. An image 22E of the roof side 22 is formed on the light receiving surface of the image sensor 70.

The coordinates of three corners of the image 22E of the roof side 22 formed on the image sensor 70 are represented as $\alpha 1$, $\beta 1$, and $\gamma 1$. The coordinates $\alpha 1=(u11,v11)$, $\beta 1=(u12,v12)$, and $\gamma 1=(u13,v13)$ of the three corners correspond to the three corners a1, b1, and c1 of the roof side 22 in the actual space. If the coordinates of the center of the image 22E of the roof side 22 are (u10,v10), the coordinates a1=(x11,y11,z11), b1=(x12,y12,z12), and c1=(x13,y13,z13) in the actual space are as follows. However, A1, B1, and C1 are coefficients (magnification).

$$x11=A1(u11-u10), y11=A1(v11-v10), z11=A1 \times f$$

$$x12=B1(u12-u10), y12=B1(v12-v10), z12=B1 \times f$$

$$x13=C1(u13-u10), y13=C1(v13-v10), z13=C1 \times f$$

As described above, since the three corners a1, b1, and c1 in the actual space are present where the coefficients A1, B1, and C1 become constants, in a case where the three corners a1, b1, and c1 in the actual space form a rectangular triangle, Expressions 2 and 3 are established.

$$\overrightarrow{a1d1} \perp \overrightarrow{b1c1} \quad \text{Expression 2}$$

$$\overrightarrow{a1c1} \perp \overrightarrow{b1e1} \quad \text{Expression 3}$$

The coefficient relationships B1/A1 and C1/A1 are determined from Expressions 2 and 3 and the relationship of the coordinates of the three corners a1, b1, and c1 in the actual space described above. Since the coefficient A1 is not uniquely determined, the size of the roof side 22 defined by the three corners a1, b1, and c1 and the distance to the roof side 22 cannot be determined; however, the direction of the roof side 22 is determined. The direction of the roof side 22 is determined regardless of whether or not the image 22E is a regular triangle.

Figure 14:
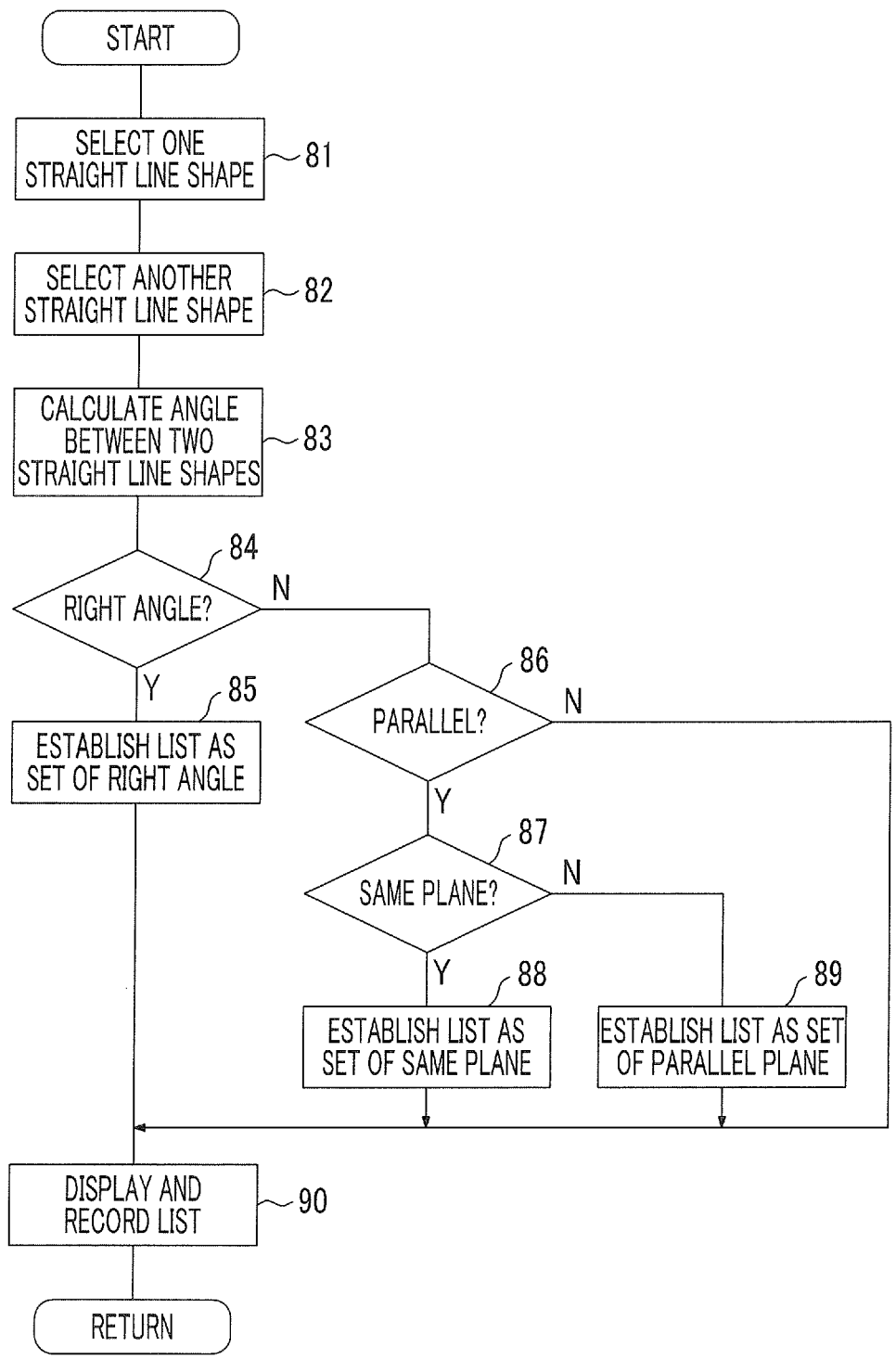
FIG. 14 is a flowchart showing a processing procedure of the image processing device.

FIG. 14 shows a modification example and is a flowchart showing a processing procedure of the image processing device. The processing procedure is performed after the processing of FIG. 6 or the like ends, and in a case where there are a plurality of specific shapes, such as a determined parallelogram, rectangle, and regular triangle, detects whether a plurality of specific shapes have a regular angle, are parallel to one another, or are on the same plane.

One specific shape among a plurality of specific shapes is selected (Step 81), and another specific shape other than the selected one specific shape is selected (Step 82). The angle between target objects in the actual space represented by the two specific shapes is calculated (Step 83). The angle is understood by detecting the directions of the target objects in the actual space as described above.

If the angle between the target objects in the actual space represented by the two specific shapes is a right angle (in Step 84, YES) (a state determination device), the two target objects are listed as a set of a right angle (Step 85).

If the angle between the target objects in the actual space represented by the two specific shapes is not a right angle (in Step 84, NO), it is confirmed whether or not the target objects are parallel to each other (Step 86) (a state determination device). If the target objects are parallel to each other (in Step 86, YES), it is confirmed whether or not the target objects are on the same plane (Step 87) (a state determination device). If the target objects are on the same plane, it is determined that the target objects in the actual space represented by the two specific shapes are on the same plane, and the two target objects are listed as a set of the same plane (Step 88). If the target objects are not on the same plane (in Step 87, NO), the two target object are listed as a set of parallel planes (Step 89).

In this way, if the target objects are listed, the list is displayed on the display device 3 and is recorded in the memory 5 (Step 90).

What is claimed is:

1. An image processing device comprising:
   a standard image input device for inputting a standard image obtained by imaging;
   a reference image input device for inputting a reference image obtained by imaging at a viewing angle different from a viewing angle when capturing the standard image;
   a specific shape candidate detection device for estimating and detecting a shape surrounded by straight lines from the standard image input from the standard image input device as a specific shape candidate having a specified shape;
   a virtual target object information generation device for generating virtual target object information for specifying a virtual target object image obtained in a case of imaging a target object represented by the specific shape candidate detected by the specific shape candidate detection device at a viewing angle different from the viewing angle when capturing the standard image;
   a virtual target object image detection device for detecting the virtual target object image from the reference image input from the reference image input device using the virtual target object information generated by the virtual target object information generation device;
   a shape determination device for determining the specific shape candidate detected by the specific shape candidate detection device as a specific shape having the specified shape when the virtual target object image has been detected by the virtual target object image detection device;
   a generation control device for controlling the virtual target object information generation device so as to generate the virtual target object information for specifying the virtual target object image obtained by changing at least one of the size and the position of the virtual target object image when the virtual target object image has not been detected by the virtual target object image detection device; and
a repetition control device for repeating detection processing in the virtual target object image detection device, determination processing in the shape determination device, and control processing in the generation control device.

2. The image processing device according to claim 1, further comprising:
a correction device for correcting a specific shape determined to be a shape having the specified shape determined by the shape determination device to a shape obtained in a case of imaging the target object from the front.

3. The image processing device according to claim 1, wherein the virtual target object information generation device generates the virtual target object information based on one or a plurality of sizes determined in advance in a case where the size of the target object is known.

4. The image processing device according to claim 1, further comprising:
an angle calculation device for calculating an angle represented by the contour of the target object in an actual space; and
a specific shape determination device for determining a target specific shape candidate among specific shape candidates detected by the specific shape candidate detection device based on an angle calculated by the angle calculation device,
wherein the virtual target object information generation device generates virtual target object information for specifying a virtual target object image obtained in a case of imaging a target object represented by a specific shape determined by the specific shape determination device at a viewing angle different from the viewing angle when capturing the standard image.

5. The image processing device according to claim 1, further comprising:
a state determination device for determining whether a plurality of specific shapes are on the same plane, parallel planes, or vertical planes in a case where there are a plurality of specific shapes specified in the shape determination device.

6. The image processing device according to claim 1, wherein the specified shape is a triangle, a rectangle, a trapezoid, or a parallelogram.

7. The image processing device according to claim 1, wherein the standard image input device is a first imaging device which captures the standard image, and
the reference image input device is a second imaging device which captures the reference image.

8. The image processing device according to claim 1, wherein the standard image input device and the reference image input device are a single imaging device, and input the standard image and the reference image obtained by imaging in the imaging device.

9. An image processing method comprising:
a step in which standard image input device inputs a standard image obtained by imaging;
a step in which reference image input device inputs a reference image obtained by imaging at a viewing angle different from a viewing angle when capturing the standard image;
a step in which specific shape candidate detection device estimates and detects a shape surrounded by straight lines from the standard image input from the standard image input device as a specific shape candidate having a specified shape;
a step in which virtual target object information generation device generates virtual target object information for specifying a virtual target object image obtained in a case of imaging a target object represented by the specific shape candidate detected by the specific shape candidate detection device at a viewing angle different from the viewing angle when capturing the standard image;
a step of detecting the virtual target object image from the reference image input from the reference image input device using the virtual target object information generated by the virtual target object information generation device;
a step in which shape determination device determines the specific shape candidate detected by the specific shape candidate detection device as a specific shape having the specified shape when the virtual target object image has been detected by the virtual target object image detection device;
a step in which generation control device performs control such that the virtual target object information generation device generates the virtual target object information for specifying the virtual target object image obtained by changing at least one of the size and the position of the virtual target object image when the virtual target object image has not been detected by the virtual target object image detection device; and
a step in which repetition control device repeats detection processing in the virtual target object image detection device, determination processing in the shape determination device, and control processing in the generation control device.

10. A non-transitory recording medium storing a computer-readable program which controls a computer of an image processing device, the program performing control such that the computer of the image processing device executes:
inputting a standard image obtained by imaging;
inputting a reference image obtained by imaging at a viewing angle different from a viewing angle when capturing the standard image;
estimating and detecting a shape surrounded by straight lines from the input standard image as a specific shape candidate having a specified shape;
generating virtual target object information for specifying a virtual target object image obtained in a case of imaging a target object represented by the detected specific shape candidate at a viewing angle different from the viewing angle when capturing the standard image;
detecting the virtual target object image from the input reference image using the generated virtual target object information;
determining the detected specific shape candidate as a specific shape having the specified shape when the virtual target object image has been detected;
performing control such that virtual target object information generation device generates the virtual target object information for specifying the virtual target object image obtained by changing at least one of the size and the position of the virtual target object image when the virtual target object image has not been detected; and repeating processing for detecting the virtual target object image, processing of the shape determination, and processing of the generation control.

* * * * *